United States Patent [19]

Heinz et al.

[11] Patent Number: 5,026,818

[45] Date of Patent: Jun. 25, 1991

[54] MELT PREPARATION OF POLYAMIDE WITH ADDITIVE COMBINATION

[75] Inventors: Hans-Detlef Heinz; Rolf-Volker Meyer; Helmut Schulte, all of Krefeld; Franz Zimmerman, Neuss, all of Fed. Rep. of Germany

[73] Assignee: Bayer Aktiengesellschaft, Leverkusen-Bayerwerk, Fed. Rep. of Germany

[21] Appl. No.: 402,665

[22] Filed: Sep. 5, 1989

[30] Foreign Application Priority Data

Sep. 17, 1988 [DE] Fed. Rep. of Germany ....... 3831707

[51] Int. Cl.$^5$ ................... C08G 69/04; C08G 69/28
[52] U.S. Cl. .................. 528/313; 528/312; 528/314; 528/318; 528/323; 528/328; 528/329.1; 528/336; 528/480; 528/481; 528/503
[58] Field of Search ............ 528/313, 312, 314, 318, 528/323, 328, 329.1, 336, 480, 481, 503

[56] References Cited

U.S. PATENT DOCUMENTS 4,892,927  1/1990  Meyer et al. ............ 528/328

FOREIGN PATENT DOCUMENTS 3912139  6/1964  Japan ............ 528/328

Primary Examiner—Harold D. Anderson
Attorney, Agent, or Firm—Connolly & Hutz

[57] ABSTRACT

The invention relates to high molecular weight (co)-polyamides and to a process for the accelerated production of polyamides during melt polycondensation using a combination of aminocaprolactam (ACL) and/or lysine components and polycarboxylic acids and known catalysts and also, if desired, for the accelerated solid-phase post-condensation of the catalyst-containing (co)-polyamides and to the polyamides produced by the processes.

5 Claims, No Drawings

MELT PREPARATION OF POLYAMIDE WITH ADDITIVE COMBINATION

This invention relates to high molecular weight (co)-polyamides and to a process for the accelerated production of (co)polyamides during polycondensation in the melt using a combination of α-aminocaprolactam (ACL) and/or lysine components and polycarboxylic acids and known catalysts and also, if desired, for the accelerated solid-phast post-condensation of the catalyst-containing (co)polyamides and to the polyamides produced by the processes.

Polyamides are a class of polymers which have been successfully used for many years for a number of practical applications and which may be produced by various processes, synthesized from different polyamide-forming components and finished for special applications either on their own or even in combination with, for example, processing aids, polymeric alloy partners or even mineral reinforcing materials (for example fillers or glass fibers) to form materials having special property combinations.

Thus, polyamides are used in large quantities for the production of fibers, plastic moldings and films and, for example, as hotmelt adhesives and auxiliaries in a number of technical applications.

Whereas lactams can be converted cationically, hydrolytically (with addition of water) or even anionically into polyamides, the polycondensation reaction is essentially the only effective method for the production of polyamides from polyamide-forming monomers, such as diamines, dicarboxylic acids or suitable derivatives, aminocarboxylic acids and lactams (cf. Vieweg, Müller: Kunststoff-Handbuch, Vol. VI, pages 11 et seq. Carl-Hanser-Verlag, München 1966).

Hydrolytic polymerization is also the most important method for the production of polyamides from lactams, for example for the production of polyamide-6 from ε-caprolactam.

It is known that polyamidescan be produced by various methods which, depending on the desired end product, use different monomer units to determine the nature of the matrix, different chain regulators to establish a desired average molecular weight or optionally even monomers containing "reactive" groups for aftertreatments to be subsequently carried out (for example amino groups or sulfonate groups to improve the dyeability of fibers with acidic or basic dyes). Continuous production processes are as well known as discontinuous processes, for example in autoclaves.

However, one feature common to all processes for the production of polyamides by polycondensation or by hydrolytic polymerization of the polyamide-forming component (diamine/dicarboxylic acid mixture or nylon salts, aminocarboxylic acids, lactams) is that, starting out from suitable monomer mixtures, the production of the polyamides generally takes a reaction time of several hours until the polyamides have reached molecular weights high enough for spinning off strands from the polymer melt or until their molecular weights are sufficiently high for the practical application envisaged.

Irrespective of the considerable time taken by the melt polymerization reaction, post-condensation, for example in the solid phase, is often necessary to obtain the even higher molecular weights required for many applications.

Accordingly, the long reaction times required for the production of the polyamides seriously restrict the capacity of the production plants and, in particular, are highly energy-consuming and expensive/plant-intensive because the reaction has to be carried out at temperatures above 200° C. and generally at temperatures above 250° C., but always above the melting point of the product to be produced.

Accordingly, a considerable reduction in the reaction times required for the production of polyamides without any effect on the well known favorable applicational properties of the products would be regarded as a major and, in particular, cost-saving advance.

In addition, it would be desirable to be able to produce products of very high melt viscosity, which hitherto could only be produced laboriously and at considerable expense, if at all, more quickly and simply than before for applications in the extrusion field.

It has now surprisingly been found that a specially selected combination of additives added to the polyamide-forming reaction mixture, i.e. to the usual polyamide-forming starting materials, enables both desirable objectives to be readily achieved, i.e. the polyamide condensation reaction to be very considerably accelerated and products of very high melt viscosity to be produced quickly and easily, whereas, using solid-phase post-condensation, the difficulties arising from very highly viscous melts are avoided.

Accordingly, the present invention relates to a process for the production of high molecular weight (co)-polyamides by melt condensation, characterized in that the polycondensation reaction is carried out in the presence of a special combination of additives consisting of (a) 0.05 to 1.5, preferably 0.15 to 1.0 and more preferably 0.2 to 0.8% by weight of compounds corresponding to general formula (I) and/or (II)

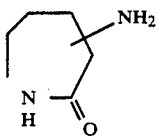
(I)
(Aminocaprolactam, preferably α-aminocaprolactam)

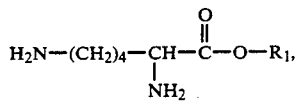
(II)
(Lysine components)

(b) a polycarboxylic acid, preferably a dicarboxylic acid, in substantially equivalent quantities to the free amino group in (I) or the second amino group in (II) respectively, (c) and 0.001 to 2% by weight, preferably 0.005 to 0.8% by weight and, more preferably, 0.01 to 0.5% by weight of a typical polyamide catalyst selected from compounds corresponding to general formulae (III) to (VII)

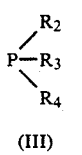
(III)

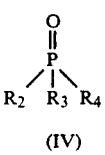
(IV)

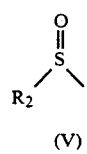
(V)

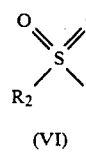
(VI)

-continued

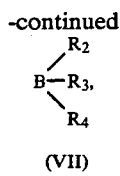

(VII)

in which
$R_1$ is hydrogen or $C_{1-18}$ alkyl or $C_{6-14}$ aryl, preferably H, $R_2$–$R_4$ independently of one another preferably represent —OH, —OM (M=monovalent or polyvalent (Pseudo)metal), $C_{1-18}$ (ar)alkoxy, $C_{6-20}$ (alk)aryl radicals optionally being substituted and the substituents $R_2$ to $R_4$ optionally may partly be replaced by hydrogen, $C_{1-18}$ (ar)alkyl or $C_{6-20}$(alk)aryl, the melt polycondensation reaction optionally being followed by solid-phase post condensation.

The present invention also relates to the (co)polyamides produced by the process described above and to their use for the production of shaped articles such as, for example, moldings, fibers, films, semifinished products, etc. The (co)polyamides post-condensed in the solid-phase are particularly suitable for the production of the shaped articles by extrusion-processes.

The compounds corresponding to general formulae (I) and (II) are principally known or may be produced by principally known methods. One specific example of a compound corresponding to general formula (I) is α-amino-ε-caprolactam (VIII) (ACL)

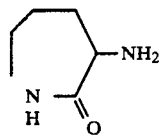

(VIII)

which, at the same time, also represents the preferred compound of this type.

Specific examples of compounds corresponding to general formula (II) are lysine, lysine hydrate, lysine methyl ester, lysine ethyl ester and lysine phenyl ester. Preferred compounds are lysine (IX) and lysine hydrate (X), lysine being present in the form of Zwitterion (with binding of the one amino group).

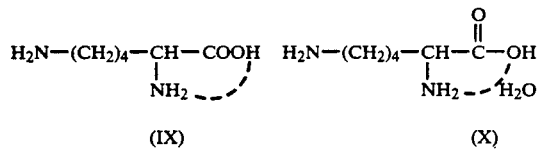

(IX)                                    (X)

There have been numerous reports of attempts to obtain basic polyamides showing better dyeability with acidic dyes, particularly when used as fibers, by co-condensation with polyamide-forming components containing basic groups. Thus, according to U.S. Pat. No. 3,651,023 for example, an improvement in the dyeability of polyamide fibers and greater intensity of color can be obtained with several different additives of the type in question.

The additives mentioned include α-aminocaprolactam and lysine, although the PA 6 types described in Examples 1, 2, 8 and 9 to 12, apart from better dyeability, are not significantly different from the Comparison Examples. On the contrary, lysine acts even as a chain terminator in a quantity of 5% (see Example 2 of U.S. Pat. No. 3,651,023), because the PA 6 formed cannot be spun because of its low melt viscosity.

There is nothing in the U.S. patent to suggest that the polyamide condensation reaction can be very considerably accelerated by use of the additive combination according to the invention or that polyamides with a clearly partly branched structure are obtained.

Similarly, there is nothing in the U.S. patent to suggest that the solid-phase post-condensation can also be very considerably accelerated by the described measure. This is all the more the case in so far as the other additives mentioned in U.S. Pat. No. 3,651,023 do not show this effect.

In EP 0 013 553, it is stated that a polymer of α-aminocaprolactam was hitherto unknown and that crosslinking must presumably occur on account of the reactivity of the amino group.

EP 0 013 553 describes polyamides of N,N-dialkyl-substituted α-amino-ε-caprolactams which are distinguished by special solubility properties. These substituted ACL's also show no accelerating effect in the combination according to the invention.

Published Japanese patent application 12 139/64 describes the use of the produced salts of lysine and certain aliphatic dicarboxylic acids for the production of polyamides. These salts are added in a quantity of from 0.5 to 5.0% by weight and preferably in a quantity of from 1.0 to 3.0% by weight. This process is attended by a number of disadvantages. Firstly, the salt has to be prepared in a separate step from lysine and the dicarboxylic acid which complicates and adds to the cost of the process. In addition, the relatively high price of lysine adversely affects economy in view of the large quantity used (preferably 1 to 3% by weight). In addition, the use of such large quantities leads to very heavily discolored products. In addition, there is nothing in the application cited above to suggest that solid-phase post-condensation can be accelerated and that products of particularly high melt viscosity and partly branched structure can be obtained.

The compounds corresponding to general formulae (III) to (VII) are catalysts known per se in the production of polyamides, as described for example in JA 47-34 592, 47-34 593, DE 2 131 931, U.S. Pat. Nos. 4,471,081, 4,433,116, 3,509,107, 3,551,548, EP 0 087 387, FR 1 485 341, J. Polym. Sci. Polym. Chem. Ed. 22, 2567 (1984) and in L.B. Sokolov, Solid Phase Polymerization, Syntheses by Polycondensation, Publ. Israel Program for Scientific Translation, 1968.

Examples of compounds corresponding to general formula (III) are triethyl phosphite, tributyl phosphite, triphenyl phosphite, tris-(2,4-di-ti-butylphenyl)-phosphite and tris-(nonylphenyl)-phosphite.

Examples of compounds corresponding to general formula (IV) are phosphoric acid, phosphoric acid esters, for example phosphoric acid ethyl ester, phosphoric acid diethyl ester, triethyl phosphate, triphenyl phosphate; phosphonic acids or phosphonic acid esters, for example methyl phosphonic acid, phenyl phosphonic acid and hypophosphorous acid or phosphorous acid.

Examples of compounds corresponding to general formula (V) are sulfurous acid and alkyl sulfinic acids, for example methyl sulfinic acid.

Examples of compounds corresponding to general formula (VI) are sulfuric acid, alkyl sulfonic acids, such as methyl sulfonic acid, and aryl sulfonic acids, such as phenyl sulfonic acid.

One example of a compound corresponding to general formula (VII) is boric acid.

Preferred catalysts are those corresponding to general formula (III) and (IV).

The additive combinations according to the invention (of aminolactams and/or lysine components on the one hand and state-of-the-art catalyst (III)–(VII) on the other hand) are surprisingly much more efficious than the compounds (III)–(VII) alone.

STARTING MATERIALS FOR POLYAMIDES

Lactams in the context of the invention are lactams containing 5 to 13 ring members, such as for example $\epsilon$-caprolactam, oenanthic lactam, caprylic lactam and lauric lactam either individually or in admixture, preferably $\epsilon$-caprolactam and lauric lactam. $\epsilon$-Caprolactam is particularly preferred.

Suitable diamines are, for example, $C_{2-20}$ alkylene diamines, such as tetramethylene diamine, hexamethylene diamine, dodecamethylene diamine etc., and cycloalkylene diamines, such as 1,4-diaminocyclohexane, bis-(4-aminocyclohexyl)-methane, 5-amino-1-aminomethyl-1,3,3-trimethyl cyclohexane (isophorone diamine) etc., as variously described in the prior art.

Suitable dicarboxylic acids are aliphatic $C_{2-38}$ dicarboxylic acids such as, for example, adipic acid, sebacic acid, azelaic acid, dodecane dioic acid and dimerized fatty acids, aromatic $C_{6-14}$ dicarboxylic acids such as, for example, isophthalic acid, terephthalic acid etc., and cycloalkylene dicarboxylic acids, such as for example 1,3- or 1,4-cyclohexane dicarboxylic acid. Instead of the dicarboxylic acids themselves in the diamine/dicarboxylic acid mixtures, it is also possible in special cases to use suitable derivatives, such as esters for example.

Suitable aminocarboxylic acids are, for example, $C_{4-18}$ aminocarboxylic acids, such as for example aminocaproic acid, aminoundecanoic acid and aminoheptanoic acid.

Preferred diamines for the production of polyamides are hexamethylene diamine, tetramethylene diamine and dodecamethylene diamine.

Preferred dicarboxylic acids are adipic acid, azelaic acid, sebacic acid, decamethylene dicarboxylic acid and dimerized fatty acids.

Preferred aminocarboxylic acids are aminocaproic acid and aminoundecanoic acid.

Preferred diamine/dicarboxylic acid mixtures or nylon salts are those of hexamethylene diamine and adipic acid or sebacic acid or azelaic acid, those of tetramethylene diamine and adipic acid and those of dodecamethylene diamine and decamethylene dicarboxylic acid.

The polyamide units may be used in virtually any mixtures, although aliphatic polyamides and those containing only a small content of aromatic units of less than 50% by weight are preferred.

The dicarboxylic acids preferably used in combination with the compounds corresponding to formulae (I) and (II) are selected, for example, from those mentioned above.

The accelerator combination according to the invention (I and/or II+polycarboxylic acid and catalysts (III)/(VII)) is added separately or together, but advantageously always before or at the beginning of the polycondensation reaction.

It is also possible to utilize the acceleration of the reaction by PA synthesis at relatively low temperatures. In the production of polyamide-6 from $\epsilon$-caprolactam for example, this leads to higher yields of polyamide and, commensurate with the temperature, to lower monomeroligomer extracts.

The polyamides obtained in accordance with the invention show a pronounced pseudoplasticity.

The polyamides produced in accordance with the invention may be discharged in known manner from the melt, preferably into a water bath, chopped up, optionally extracted and dried.

The polyamides may be processed, again in known manner, to moldings, fibers and films.

The polyamides of high melt viscosity post-condensed in the solid-phase are preferred for processing, for example, by extrusion or blow molding.

The polycondensation mixture may also contain stabilizers, such as for example metal salts (Cu, Mn salts), sterically hindered phenols and amines and other standard additives in typical quantities.

Additives such as nucleating agents, pigments, dyes, carbon black, reinforcing materials and reinforcing fibers, for example kaolin, glass fibers or the like and other additives may also be present in the polyamides. High-impact modifiers, of the type known in large numbers in the prior art, may also be added to the polyamides.

Monocarboxylic acids may also be present in typical quantities as chain terminators.

The polycondensation may be carried out continuously or discontinuously (by polycondensation is meant both polycondensation, for example of nylon salts, and the hydrolytic polymerization of lactam-containing starting materials).

In one preferred embodiment of the invention, the (co)polyamides produced in accordance with the invention may also be subjected to subsequent post-condensation in the solid-phase, PA 6 and 66 or 6/66-copolyamides being preferred. PA 6 and polyamides rich in caprolactam are particularly preferred.

To this end, (co)polyamide granulate is heated in vacuo or in an inert gas (stream) for a desired period at a temperature in the range from 140° to 250° C., preferably at a temperature in the range from 160° to 230° C., but at least 10° C. and preferably at least 20° C. below the melting temperature of the particular polyamide. The longer the time selected, the higher the molecular weights reached.

The solid-phase post-condensation may be carried out discontinuously, for example in a tumble dryer or spiral mixer, and continuously. Nitrogen is preferably used as the inert gas.

The post-condensation times are best in the range from 0.5 to 30 h and preferably in the range from 1.0 to 20 h, the longer reaction times preferably being applied at relatively low temperatures and vice versa.

(Co)polyamides of very high melt viscosity post-condensed in the solid-phase, in which lysine and/or aminocaprolactam are incorporated, can be effectively produced both quickly and easily in this way. The present invention also relates to these polyamides which are particularly suitable for use in the extrusion field.

PA 6 and polyamides rich in caprolactam units are particularly preferred for this application.

The (co)polyamides produced by the process according to the invention may be used for any applications where polyamides are normally used, for example for injection molding, for the production of fibers and films and other articles. They show substantially the same property spectrum as comparison products (they show distinct pseudoplasticity) but are more economical and quicker to produce. This unexpected and unforeseeable effect is made possible solely by the additive combination according to the invention. Furthermore, it is thus possible by the solid-phase post-condensation to obtain (co)polyamides which cannot be reasonably or usefully produced by direct melt condensation because their melt viscosity makes them very difficult to handle in reactors, autoclaves, etc.

The following Examples are intended to illustrate the invention without limiting it in any way.

The melt viscosity was measured by a Contraves-RM 300 plate/cone viscosimeter.

EXAMPLES

Example 1

92.5 g caprolactam, 9.4 g aminocaproic acid, 1.025 g 50% aqueous α-amino-ε-caprolactam (ACL) solution, 0.38 g azelaic acid and 0.52 g tris-(2,4-di-t-butyl)-phenyl phosphite were weighed into a 250 ml round-bottomed flask. After purging with nitrogen, the contents of the flask were heated with stirring to 200° C. and kept at that temperature for 1 hour. The temperature was then increased to 270° C. and the reaction mixture polycondensed with slow stirring for 1 hour 20 minutes. The flask was removed and, after cooling of the polymer, was shattered. The polymer was chopped up and extracted with water for 24 hours. The data are shown in Table 1.

Comparison Example 1

PA 6 was produced in the same way without the combination of ACL and azelaic acid (AzA). The data are shown in Table 1.

It can be seen that, without ACL/AzA, the reaction time required to reach the same viscosity is much longer.

Examples 2 to 4

PA 6 samples of different molecular weight were produced as described in Example 1 from 81.5 g caprolactam and 9.4 g aminocaproic acid by reaction times of different length. The additive combination consisted of 1.025 g 50% aqueous ACL solution, 0.38 g azelaic acid and 0.05 g triphenyl phosphite. The polymer was extracted with methanol. The data are shown in Table 1.

Comparison Examples 2 to 4

PA 6 samples were produced in the same way without ACL and azelaic acid. The data are shown in Table 1.

Example 5

A PA 6 was produced as described in Examples 2 to 4 from 81.5 g caprolactam and 9.4 g aminocaproic acid. 0.66 g lysine hydrate, 0.38 g azelaic acid and 0.05 g triphenyl phosphite were added as the additive combination. The polycondensation time was 1.5 h. The data are shown in Table 1.

Comparison Example 5

Example 5 was repeated without the addition of lysine hydrate and azelaic acid. The data are shown in Table 1.

TABLE 1

| Example | Time at 270° C. (h) | $\eta_{rel}$[1] | MV[2] (Pas) |
|---|---|---|---|
| 1 | 1.33 | 3.8 | — |
| Comparison Example 1 | 3 | 3.9 | — |
| 2 | 0.75 | 3.0 | — |
| 3 | 1.5 | 5.1 | about 10000[3] |
| 4 | 3.0 | 6.2 | — |
| Comparison Example 2 | 0.75 | 2.5 | — |
| Comparison Example 3 | 1.5 | 3.2 | 500 |
| Comparison Example 4 | 3.0 | 4.8 | — |
| 5 | 1.25 | 3.3 | 2200 |
| Comparison Example 5 | 1.25 | 3.2 | 420 |

[1] Relative solution viscosity; 1% in m-kresol, 25° C.
[2] Melt viscosity at 270° C.; shear rate 2–3 s$^{-1}$
[3] Despite its very high melt viscosity, the sample is satisfactorily soluble in m-cresol and, hence, is not crosslinked.

Examples 6 to 10

A series of 6/66 copolyamides was produced as described in Example 5. 1.0 g of a 50% aqueous ACL solution, 0.37 g azelaic acid and 0.05 g triphenyl phosphite were used as the additive combination. The data are shown in Table 2.

Comparison Examples 6 to 10

Corresponding co-PA's were produced in the same way without ACL and azelaic acid. The data are shown in Table 2.

Examples 11 to 13

Copolyamides were produced from caprolactam and AH salt in the same way as described in Examples 6 to 10. The additive combination consisted of 0.65 to 0.66 g lysine hydrate, 0.37 to 0.38 g azelaic acid and 0.05 g triphenyl phosphite. The data are shown in Table 2.

Comparison Examples 11 to 13

Copolyamides were produced in the same way as in Examples 11 and 12 without lysine hydrate and azelaic acid. The data are shown in Table 2.

TABLE 2

| Example | Time at 270° C. (h) | Cl | PA of AH salt | Co-PA 6/66 | $\eta_{rel}$ | MV at[1] 270° C. (Pas) |
|---|---|---|---|---|---|---|
| 6 | 1.16 | 90 | 11.6 | ca. 95/5 | 4.2 | — |
| 7 | 0.84 | 75 | 29 | ca. 75/25 | 5.5 | — |
| 8 | 0.50 | 50 | 58 | ca. 50/50 | 3.3 | 3500 |
| 9[2] | 0.33 | 25 | 87 | 25/75 | 3.5 | 890 |
| 10[2] | 0.25 | 15 | 98.5 | 15/85 | 3.0 | — |
| Comparison Example 6 | 1.16 | 90 | 11.6 | ca. 95/5 | 3.3 | — |
| Comparison Example 7 | 0.84 | 75 | 29 | ca. 75/25 | 3.5 | — |
| Comparison Example 8 | 0.50 | 50 | 58 | ca. 50/50 | 2.6 | 260 |

TABLE 2-continued

| Example | Time at 270° C. (h) | Cl | PA of AH salt | Co-PA 6/66 | $\eta_{rel}$ | MV at[1] 270° C. (Pas) |
|---|---|---|---|---|---|---|
| Comparison Example 9[2] | 0.33 | 25 | 87 | 25/75 | 3.2 | 103 |
| Comparison Example 10[2] | 0.25 | 15 | 98.5 | 15/85 | 2.7 | — |
| 11 | 1 | 90 | 11.6 | ca. 95/5 | 3.7 | — |
| 12 | 2 | 80 | 20 | ca. 83/17 | 3.4 | 3000 |
| 13 | 0.8 | 75 | 29 | ca. 75/25 | 4.1 | — |
| Comparison Example 11 | 1 | 90 | 11.6 | ca. 95/5 | 2.9 | — |
| Comparison Example 12 | 2 | 80 | 20 | ca. 83/17 | 3.1 | 225 |
| Comparison Example 13 | 0.8 | 75 | 29 | ca. 75/25 | 2.8 | — |

[1] At 1-3 s$^{-1}$
[2] Prepared at 280° C.

Example 14

A PA 6,10 was produced from 71.6 g sebacic acid and 41.1 g hexamethylene diamine. The additive combination consisted of 1.0 g of a 50% aqueous ACL solution, 0.37 g azelaic acid and 0.05 g triphenyl phosphite. The data are shown in Table 3.

Comparison Example 14

A PA 6,10 was produced in the same way without ACL and azelaic acid. The data are shown in Table 3.

Example 15

A PA 6,10 was produced in the same way as described in Example 13, except that the quantity of ACL was reduced to 0.6 g (50% aqueous solution). The data are shown in Table 3.

Comparison Example 15

A PA 6,10 was produced in the same way without ACL and azelaic acid. The data are shown in Table 3.

TABLE 3

| Example | Time at 270° C. (mins.) | $\eta_{rel}$ | MV[1] (Pa · s) at 270° C. |
|---|---|---|---|
| 14 | 10 | 3.8 | — |
| Comparison Example 14 | 10 | 2.2 | — |
| 15 | 105 | 3.7 | 1200 |
| Comparison Example 15 | 105 | 3.4 | 500 |

[1] Shear rate 0.1-1.0 s$^{-1}$

Example 16

10 kg Caprolactam, 1 kg water, 114 g 50% aqueous lysine solution, 27 g adipic acid and 5 g triphenyl phosphite were weighed into a 25 liter autoclave and, after purging with inert gas, were heated under their own pressure for 1 hour to 200° C. The autoclave was then vented to atmospheric pressure and, at the same time, heated to 270° C. After reaching atmospheric pressure, 40 l N$_2$ h$^{-1}$ were passed over. The build-up of the melt viscosity was determined via the rotational speed of a stirrer rotating under constant force. The desired melt viscosity was reached at a temperature of only 260° C. The stirrer was switched off, the polyamide was left to settle for 1 hour and then forced out of the autoclave with N$_2$. The strands were delivered via a water bath to a chopping machine, extracted with H$_2$O and dried. The product had a relative viscosity of 3.3 and a melt viscosity, as measured at 250° C. and at a shear rate of 2.26 s$^{-1}$, of 1035 Pas$^{-1}$. Without lysine and adipic acid, a corresponding melt viscosity is only reached after about 1.5-2.0 hours at 270° C.

Example 17

A PA 6 was prepared at 235° C. in the same way as described in Example 16. The reaction time was 30 minutes. The relative solution viscosity of the PA 6 (1% in m-kresol, 25° C.) was 3.5.

Example 18

A PA 6 was prepared at 235° C. in the same way as described in Example 16. In addition to the additive combination, 22.3 g of a stabilizer mixture of CuI, KBr and triphenyl phosphine were also added. The solution viscosity after 2 h at 235° C. was 3.6 and the extract content (methanol, 24 h) only 7.1%.

Example 19

Approximately 50 g of the PA 6 granulate obtained in Example 16 were post-condensed for 7 h at 170° C. in a rotary evaporator in a stream of nitrogen (40 l h$^{-1}$) and at 50 rpm$^{-1}$. The melt viscosity of the PA 6 was approximately 4750 Pas at 250° C. and 2-3 s$^{-1}$, i.e. the melt viscosity increased by a factor of 4.5.

A PA 6 produced as in Example 16, but without lysine and adipic acid, undergoes an increase in its melt viscosity of only about 500 to approximately 1200 Pa.s.

As the Examples show, the prior art can be significantly improved by the additive combination according to the invention.

We claim:

1. A process for the accelerated production of high molecular weight (co)polyamide from monomer mixtures of diamine/dicarboxylic acid mixture or nylon salts, amino carboxylic acids, or lactams by melt polycondensation in the presence of an additive combination consisting of:

(a) 0.05 to 1.5% by weight of a compound corresponding to the formula (I) or (II)

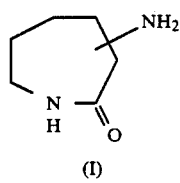
(I)

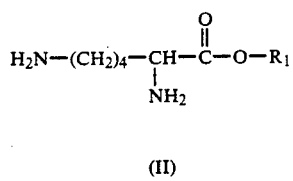
(II)

or mixtures of (I) and (II);

(b) a polycarboxylic acid in a quantity substantially equivalent to the free amino group in (I) or the second amino group in (II) respectively;

(c) and 0.001 to 2% by weight of a polyamide catalyst selected from compounds corresponding to the formulae (III) to (VII)

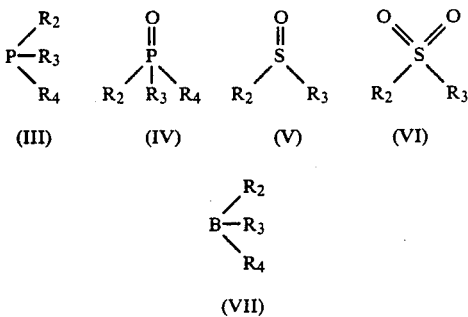

(III)  (IV)  (V)  (VI)

(VII)

in which $R_1$ is hydrogen or $C_{1-18}$ alkyl or $C_{6-14}$ aryl, $R_2$–$R_4$ independently of one another represent —OH, —OM wherein M is a monovalent or polyvalent metal, $C_{1-18}$ (ar)alkoxy, $C_6$-(alk)aryloxy, a $C_{1-18}$ (ar)alkyl or $C_{6-20}$ (alk)aryl radical which is optionally substituted and the substituents $R_2$ to $R_4$ being partly replaceable by hydrogen, $C_{1-18}$ (ar)alkyl or $C_{6-20}$ (alk)aryl.

2. A process as claimed in claim 1, wherein the additive combination is added before or at the beginning of the polycondensation reaction.

3. A process as claimed in claim 1, wherein α-amino-ε-caprolactam is the compound corresponding to formula (I); lysine, optionally in the form of an aqueous solution, or lysine hydrate is the compound corresponding to formula (II); esters of phosphorous acid are the compounds corresponding to formula (III) and the compound of the formula (IV) is selected from phosphoric acid, phosphonic acids, phosphorous acid, hypophosphorous acid or esters or salts thereof.

4. A process as claimed in claim 1, further comprising solid-phase post-condensation continuously or discontinuously at temperatures in the range from 140° to 250° C. but which are at least 10° C. below the melting point of the (co)polyamide.

5. A process as claimed in claim 4, wherein the post-condensation time is between 0.5 and 30 h.

* * * * *